Dec. 28, 1926.  1,612,724
J. C. HOUSEKEEPER
METHOD OF PRODUCING MULTICOLORED GRAIN EFFECT IN SHEET RUBBER
Filed March 11, 1925     2 Sheets-Sheet 1

Inventor
Jacob C. Housekeeper
By Spencer Sewall & Hardman
his Attorney

Dec. 28, 1926.

J. C. HOUSEKEEPER 1,612,724

METHOD OF PRODUCING MULTICOLORED GRAIN EFFECT IN SHEET RUBBER

Filed March 11, 1925  2 Sheets-Sheet 2

Inventor
Jacob C. Housekeeper

By Spencer Sewall Hardman
his Attorneys

Patented Dec. 28, 1926.

1,612,724

UNITED STATES PATENT OFFICE.

JACOB C. HOUSEKEEPER, OF DAYTON, OHIO, ASSIGNOR TO THE INLAND MANUFACTURING COMPANY, OF DAYTON, OHIO, A CORPORATION OF DELAWARE.

METHOD OF PRODUCING MULTICOLORED GRAIN EFFECT IN SHEET RUBBER.

Application filed March 11, 1925. Serial No. 14,760.

This invention relates to a method of producing an irregular multi-colored grain effect in hard rubber and has special reference to the manufacture of a handwheel rim having an outer casing of hard rubber having a multicolored grain effect.

An object of this invention is to provide a simple, efficient and economical method of producing a sheet of unvulcanized rubber having an irregular grain effect therein.

Another object is to produce a hard rubber rim having an irregular grain effect therein.

Further objects and advantages of the present invention will be apparent from the following description, reference being had to the accompanying drawing, wherein the method of the present invention is clearly indicated.

Fig. 1 in the drawing illustrates certain steps in the method of this invention.

Figure 1:
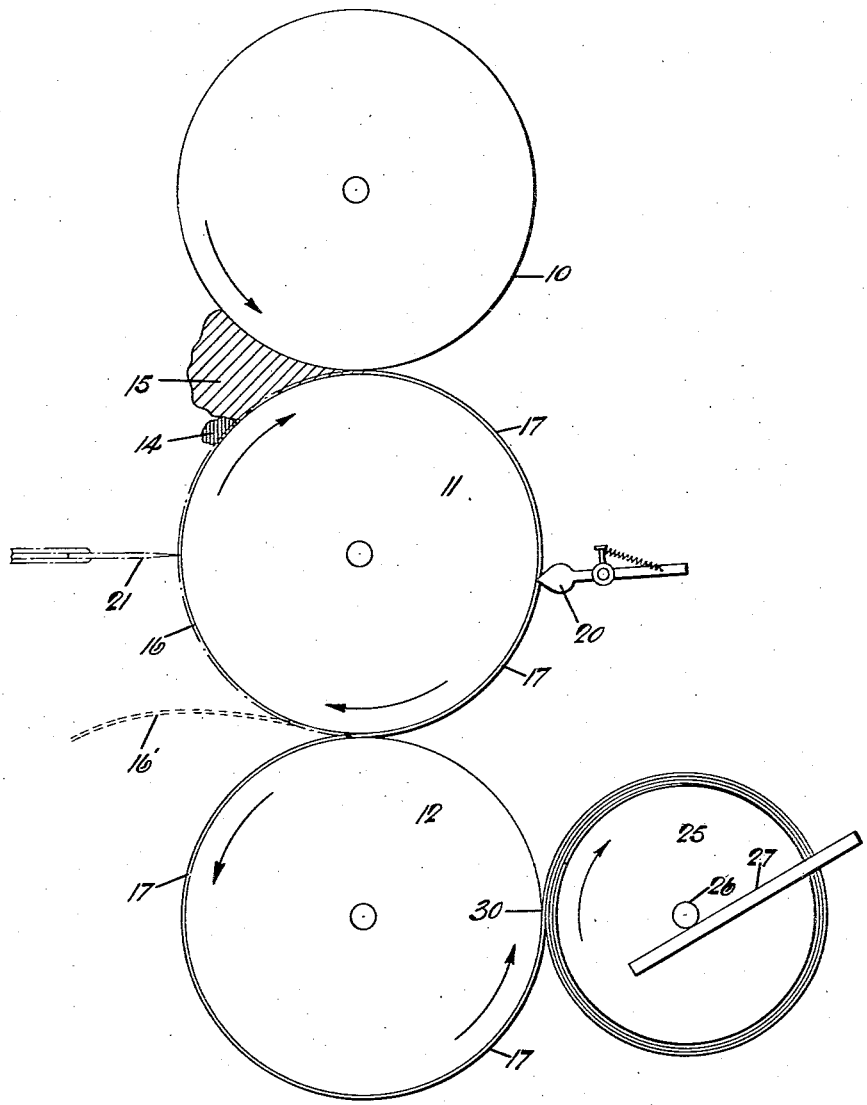

A conventional type of rubber calendering machine is diagrammatically illustrated by the three calender rolls 10, 11 and 12. The rolls are driven in the direction of the arrows in any well known manner and are provided with well known means for adjusting the distance between the rolls whereby the thickness of the calendered sheet may be regulated. The several rolls are provided with well known means for internally heating or cooling, as by steam or water pipes leading thereinto through the bearings of the rolls.

This invention contemplates the use of such a conventional calender in the method of making a sheet of unvulcanized rubber having an irregular grain effect therein. In the following description actual weights instead of the proportions of the different rubber compounds are given in order to give a clearer visualization of the method as commercially carried out. The colors, weights and dimensions given are those found satisfactory in producing unvulcanized rubber strips used as cover stock in the manufacture of automobile steering wheels.

About 200 lbs. of thoroughly milled brown colored rubber stock warmed in the mixing mills to the proper temperature for calendering is fed, a portion at a time, between rolls 10 and 11 as shown at 15 in the drawing, the calender rolls having first been brought to the proper temperature by turning on the steam and heating them internally in a manner well known. The brown stock is run on roll 11 until it is rolled into a sheet shown by the dot and dash line 16 approximately $\frac{3}{32}$ of an inch in thickness and free from holes.

In the meantime small pieces, preferably of about 2 lbs. each, of a different colored rubber will have been prepared as follows: About 69 lbs. of thoroughly milled and warmed black colored rubber stock is rolled into sheets about $\frac{5}{16}$ of an inch in thickness, and about 13 lbs. of thoroughly milled red colored rubber stock is rolled into sheets of about the same width and length as the black sheets and to a thickness of about $\frac{1}{16}$ of an inch. A black and a red sheet are now laid one upon the other and rolled together to form a roll having alternate red and black layers. This roll is then divided by any suitable means into small hunks of about 2 lbs. each so that each piece contains black and red rubber approximately in the proportion of five to one.

The trimming knives 20 are set to trim the sheet 16 on roll 11 to a width of 24 inches. The sheet 16 is now cut across by hand by knife 21 while the calender rolls continue to run and the advancing end thereof started around the lower roll 12, as illustrated at 16' in the drawing. A drum 25 of suitable dimensions is supported by journals 26 upon a stationary inclined support 27 and hence the drum 25 rides against the periphery of calender roll 12 and is driven thereby as will be obvious from the drawing. The advancing end of sheet 16 after it passes the point of contact 30 between the roll 12 and drum 25 is caught by an operator and started around the drum 25. As the calender rolls now continue to run the bank 15 of brown rubber continues to feed in between rolls 10 and 11 and passes around rolls 11 and 12 as shown by the full lines 17 and is coiled upon the drum 25, as clearly illustrated. Of course as the coil builds upon drum 25 the journals 26 slide along the stationary support 27.

As soon as everything is in readiness to cut sheet 16 in two and start it on the lower roll 12, several of the above mentioned 2 lbs. pieces of colored rubber are fed into the calender distributed along the upper side of roll 11 and between the roll and the bank 15 (as shown at 14 in the drawing). Since it would ordinarily make little difference about having no colored streaks in the first layer or so on drum 25 the pieces 14 may not be fed into the calender until after sheet 17 has been started on the drum 25. The action of the roll 11 and the rubber bank 15 on the small pieces 14 is to cause said pieces 14 to be pulled in under the bank 15 and to be fed in between rolls 10 and 11 causing them to be greatly elongated and to thus cause long irregular colored streaks in the sheet 17 which of course is composed chiefly of the brown rubber from the bank 15. As the several pieces 14 are fed through the rolls other similar pieces 14 are fed into the calender in the same manner, being distributed along the width of sheet 17. In this manner the brown sheet 17 is continually streaked with long irregular black streaks with smaller red streaks therein. This operation is carried on until the entire 200 lbs. of the brown rubber stock is converted into sheet and wrapped upon the drum 25, the 2 lbs. pieces 14 being intermittently fed into the rolls at such frequencies as to distribute the entire amount of red and black rubber approximately evenly throughout the coiled sheet 17.

Figure 2:
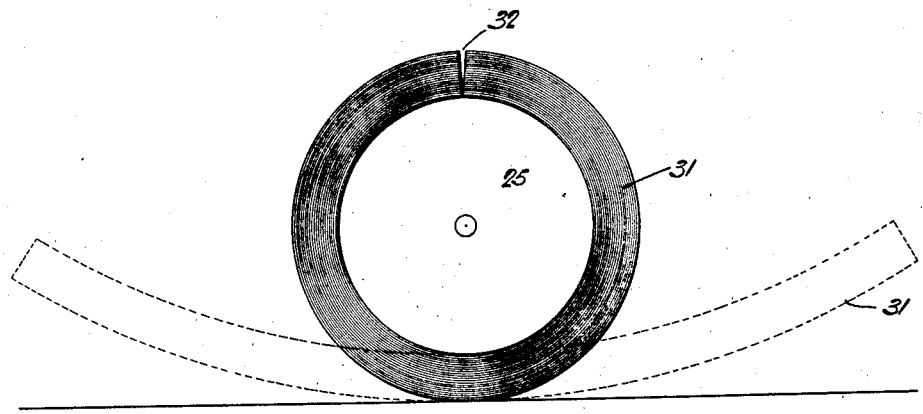
Fig. 2 illustrates the steps of removing the rubber from the receiving drum.
Figure 3:
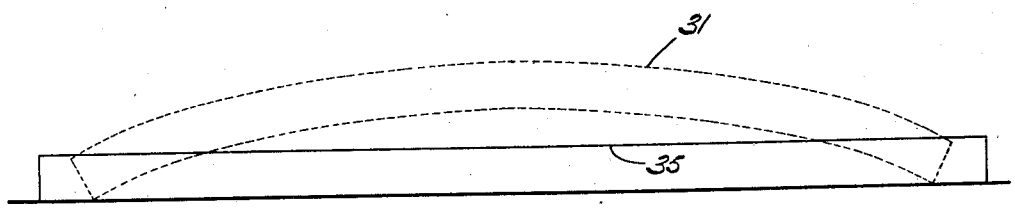
Fig. 3 illustrates the flattening out of the rubber into a slab.
Figure 4:
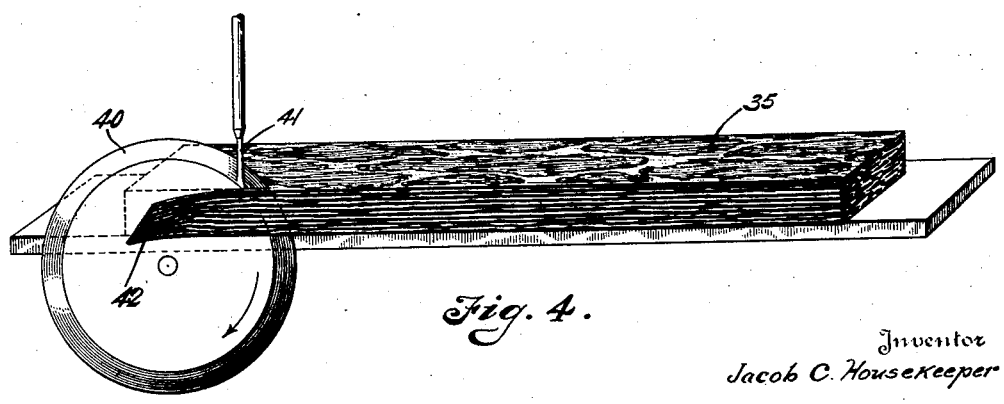
Fig. 4 illustrates diagrammatically the slicing of the slab into thin strips.

The drum 25 is now taken from the calender and the cylinder 31 of coiled rubber thereon cut lengthwise at 32, as indicated in Fig. 2, and taken off the drum 25 and placed on a flat surface so that it will flatten out by gravity and form a slab 35 as indicated in Fig. 3. This slab should measure approximately 3½" thick, 24 inches wide and 67 inches long when cool. The slab 35 is permitted to cool for about 48 hours or more, after which it is placed on a suitable slicing machine indicated diagrammatically in Fig. 4, having a rapidly rotating circular blade 40 kept wet with running water 41, and strips 42 of approximately ⅛ inch thickness sliced off the edge of the slab 35 in the peripheral direction in which the rubber was coiled upon drum 25. These strips will therefore be 3½ inches wide and the face of each strip 42 will therefore represent a cross section through the superimposed layers of the sheet 17 which is irregularly streaked with the black and red streaks. By slicing the slab 35 in the peripheral direction of the coiled rubber the streaks will extend longitudinally of the strips 42 and give an irregular grain effect therein. These strips may be now used as cover stock for applying a decorative outer casing to a rubber core of lighter or cheaper material for making rims for handwheels, especially such as are employed as steering wheels on automobiles. One method of applying a cover stock to a rubber core and vulcanizing the same to form a unitary rim of hard rubber is disclosed in Patent No. 1,475,602 issued Nov. 27, 1923. The cover stock made according to this invention may be applied to the core stock in the manner disclosed in the said patent or in any other manner easily devised by those skilled in the art.

It is to be understood that the method of this invention may be equally well employed with two, four, or more colors instead of with three colors as has been described hereinabove in detail. Also, of course, the proportions of the different colors may be changed as desired to increase or decrease the amount of any particular color in the grained cover stock.

While the method of the present invention as herein disclosed is preferred, it is to be understood that variations might be easily devised by those skilled in the art, all coming within the scope of the claims which follow:

What is claimed is as follows:

1. The steps in the method of making a varicolored sheet of unvulcanized rubber comprising: feeding a mass of milled rubber between calender rolls and, during said feeding, feeding relatively small masses of unvulcanized rubber of another color between said rolls whereby the sheet from said calender rolls is irregularly streaked with said second color, winding this streaked sheet upon a drum to a considerable thickness and permitting the layers to adhere together to form a cylindrical mass, removing and flattening this cylindrical mass into a substantially flat slab and then slicing off sheets from the edge of said slab longitudinally in the direction of the grain of the rubber.

2. The steps in the method of making a grained sheet of unvulcanized rubber comprising: feeding a mass of milled rubber between calender rolls and simultaneously feeding unvulcanized rubber of another color between said rolls to produce a streaked calendered sheet, winding this streaked sheet upon a drum to form an adhering cylindrical mass, removing and flattening this cylindrical mass into a slab, and then slicing off sheets from the edge of said slab so that the face of the strips represents a cross section through the superimposed layers of streaked calendered sheet.

3. The steps in the method of making a grained sheet of unvulcanized rubber comprising: feeding a mass of milled rubber between calender rolls and simultaneously feeding unvulcanized rubber of another color between said rolls to produce a streaked calendered sheet, making a relatively thick slab from a plurality of layers of this streaked sheet with the grain thereof all extending in the same direction, and slicing off sheets from the edge of said slab in the direction of the grain of the colored streaks.

4. The steps in the method of making a grained sheet of unvulcanized rubber comprising: feeding a mass of milled rubber between calender rolls and simultaneously feeding unvulcanized rubber of another color between said rolls to produce a streaked calendered sheet, forming a slab by superimposing upon one another a plurality of layers of this streaked calendered sheet, and slicing off strips from an edge of said slab so that the face of said strips represents a cross section through the superimposed layers of streaked calendered sheet.

In testimony whereof I hereto affix my signature.

JACOB C. HOUSEKEEPER.